F. A. GESSLER.
MILK AND AIR LINE CONNECTION FOR MILKING MACHINES.
APPLICATION FILED APR. 2, 1921.
1,425,585.
Patented Aug. 15, 1922.
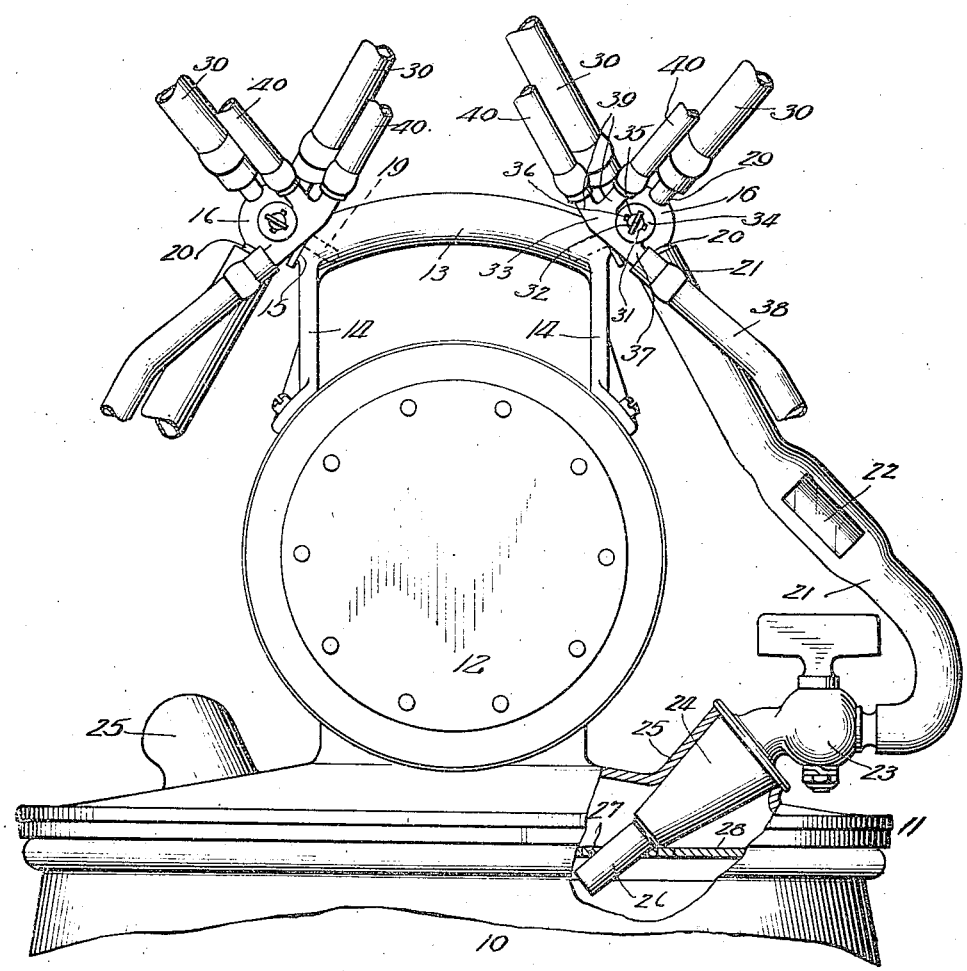
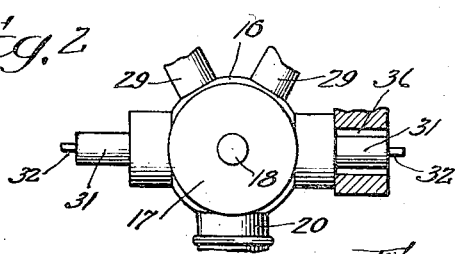
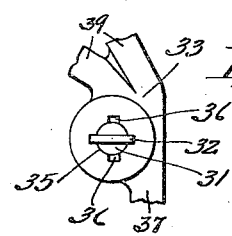

UNITED STATES PATENT OFFICE.

FREDERICK A. GESSLER, OF LA GRANGE, ILLINOIS, ASSIGNOR TO ELECTRIC MILKER CORPORATION, OF CHICAGO, ILLINOIS, A CORPORATION OF DELAWARE.

MILK AND AIR LINE CONNECTION FOR MILKING MACHINES.

1,425,585.  Specification of Letters Patent.  Patented Aug. 15, 1922.

Application filed April 2, 1921. Serial No. 457,958.

*To all whom it may concern:*

Be it known that I, FREDERICK A. GESSLER, a citizen of the United States, residing at La Grange, in the county of Cook and State of Illinois, have invented certain new and useful Improvements in Milk and Air Line Connections for Milking Machines, of which the following is a specification.

This invention relates primarily to a milking machine of that type which employs separate milk and air connections between the milk receptacle and the teat cups which are connected to the teats of the cow during the milking operation; and the object of the invention is to so construct these pipe connections that they may be readily removed from the milk receptacle for the purpose of cleaning which, of course, is a primary purpose in the art to which the present invention pertains.

A further object is to so arrange these connections that they may be readily secured to and removed from the milk receptacle in such a manner as to promote convenience in transporting the milk receptacle from place to place.

Further objects and details of the invention will appear from the specification and drawings in which—

Figure 1 is a side elevation of the top of a milk pail equipped with the pipe line connections of the present invention;

Fig. 2 is a detail showing the header block from which four pipe lines lead to the teat cups (not shown);

Fig. 3 is a detail showing the connection for a pair of air line pipes to the header; and Fig. 4 is a detail in section of the connected branch air and milk line pipes.

The present invention is shown as applied to a milk pail 10 having a removable cover 11 upon the center of which is supported a combined header and pump 12 fitted to produce a vacuum in the interior of the pail. The combined motor and pump is shown conventionally since the present invention is not concerned with the details of construction in this portion of the device.

The motor casing has secured thereto a handle 13 supported upon vertical standards 14 rising from the upper portion of the motor casing, and the end faces of the handle portion at the point of mergence with the standards are beveled and flattened at the point 15 to provide a seat for a header block 16 which is of generally spherical formation having a flat base 17 (see Fig. 2), from which protrudes a dowel 18 which is socketed within a recess 19 obliquely bored within the flattened seating face of the handle, the arrangement being such that when the dowel 18 is entered into the socket hole 19 the base 17 of the header will abut against the flattened seating face and maintain the header in the oblique relation indicated in Fig. 1, the arrangement being duplicated at each end of the handle.

The header is provided on its lower side with a nipple 20 which affords a point of connection for a milk line tube 21, preferably formed of rubber, and provided at a suitable point with a visible gauge glass 22 which enables the operator to observe the flow of milk through the milk line. The milk line tube at its lower end connects with a stop cock 23, which latter has formed thereon a conical sealing plug 24 which is designed to fit into an obliquely disposed socket 25 in the cover. The sealing plug 24 has projected therethrough a tube 26 which forms a continuation of the stop cock and is of a sufficient length to project obliquely through an opening 27 in an inner removable false cover bottom 28, so that with the plug seated in position for use the milk will be delivered into the interior of the pail. These features are duplicated on opposite sides of the cover which, as shown, is equipped for the simultaneous milking of a pair of cows, a single milk line connection being provided for each cow.

The header block 16, in addition to the nipple 20, is provided on its upper surface with four radiating nipples 29 divergently extending with respect to one another, which latter nipples afford points of connection for four branch milk pipes 30, preferably of rubber, which extend to and make connection with the four teat cups comprising a set. The teat cups may be of any suitable or well known type, and are not illustrated in the drawings. Of course, the leads of tubing should be of sufficient length to afford easy manipulation of the teat cups, and should likewise be sufficiently long to permit the milk pail to be positioned at a slight distance from the cow being milked, but these considerations apply equally to milking generally and are matters which are well understood in the art.

Each header block on each side thereof, and at points coincident with its transverse diameter, is provided with an outwardly projecting stud 31 which has formed on its outer end a transverse fin 32, the ends of which project slightly beyond the sides of the stud, and this arrangement affords an attachment for an air line Y-shaped fitting 33 having formed on one side a lug 34 having through its center a transverse bore 35 on each side of which is formed a groove 36 of a size to slip over the fin 32, the arrangement being such that when the fitting 33 is turned to proper position to bring the grooves 36 into register with the fin 32, the fitting may be slipped into place on the stud, in which position it will lie inside of the fin 32, so that the fitting may be then turned into right angle position shown in Fig. 1, and the parts held against displacement. It will also be observed that the lug 34 normally occupies a position above the fitting, so that the center of weight is below the lug, and the arrangement of the slots and fin is such that when the fitting is normally hanging from its point of support, the slot and groove will occupy transverse relations with respect to one another, so that accidental displacement is impossible, but a ready removal of the air line fitting and associated connections can be effected by proper manipulation.

The Y-shaped air line fitting 33 at its lower end is provided with a nipple 37 which affords a point of connection for a main air line tube 38, the lower end of which is connected to a pulsator of any suitable type now commonly in use on milking machines, which pulsator, as is fully understood in the art, is designed to make an intermittent connection with the interior of the pail for the purpose of intermittently establishing a vacuum connection with the associated teat cup or cups. These features are too well understood to require illustration or further description.

The air line fitting is further provided with a pair of branch nipples 39 which afford points of connection for branch air line pipes 40 of rubber or the like, and in view of the fact that the main motor block affords connections for two air line fittings, each accommodating a pair of branch air line pipes or tubes, it is obvious that the arrangement affords a milk pipe and an associated air pipe for each of four teat cups which comprise a single set, two complete sets being indicated in the construction shown.

It is further to be observed that each teat cup requires the employment of a branch milk line pipe and a branch air line pipe or tube, and in order to promote convenience in the assembling or disassembling of these connections, the associated air and milk tubes leading to the same teat cup are preferably secured together in some suitable way, as, for instance, by provision of a connecting rubber fin or the like, as indicated in Fig. 4. Obviously metal clips or other suitable modes of attachment may be employed with equal facility, although the formation of the integral rubber fin is of peculiar value in that it enables the pipe to be readily cleaned without interference from projecting metallic parts which might serve as points of obstruction for the accumulation of dirt or the like. It is desirable, however, that the connecting fin be terminated short of the ends of the component tubes, so that the latter may be freely manipulated without interference from one another in making connection with the respective milk and air line nipples.

When in condition for operation, the parts will occupy the positions indicated in the drawings, from which it will be observed that one main milk line connection serves as a header for four branch milk line connections on each complete set. It will also be observed that each set comprises two main air line connections, each of which receives pulsations from the pulsating mechanism of whatsoever character employed, and the pulsations imparted to each main air line connection will be communicated in unison through each branch air line connection on the same side of the header block. This arrangement will obviously result in concurrent pulsations in two of the four teat cups, or, in other words, the teat cups will operate in pairs, although it is not the intention to limit the principal features of the present invention to this precise arrangement, since the invention is one which readily lends itself to use in a construction in which four continuous air line leads to the pulsator are employed in place of two. If four such independent leads are employed, the pulsating action can be imparted to each of the four teat cups in succession or otherwise, depending upon the details of construction of the pulsator itself which need not be here described.

When it is desired to disassemble the device for purposes of cleaning or otherwise, the complete tubing and fitting comprising a set can be instantly removed as a unit from the seating support on the handle and the plug withdrawn from its socket on the pail cover, after which the complete set can be cleansed as a unit, or, if desired, the air line fittings can be turned to a position which brings the grooves into alignment with the fin on the header block, so that these parts can thus be quickly disassembled and cleaned, repaired or manipulated separately. The manner of supporting the sets of tubes in unit form at each end of the handle affords a ready and convenient means of mounting, and these parts are in suitable position for use and in convenient relation to one another for transportation from place to place. In the art to which the present invention pertains, these are features of major importance in promoting the convenient and sanitary use of the machine for milking purposes.

I claim:

1. In a milking machine, the combination with a milk receptacle, a header block removably supported upon the receptacle, a milk line connection between the receptacle and the header block, the same being removably connected with the receptacle, branch milk line pipes connected with the header block and communicating therethrough with the main milk line pipe, air line pipes associated with the respective milk line branch pipes, and means for supporting the air line pipes upon the header block, substantially as described.

2. In a milking machine, the combination with a milk receptacle, a header block removably supported upon the receptacle, a milk line connection between the receptacle and the header block, the same being removably connected with the receptacle, branch milk line pipes connected with the header block and communicating therethrough with the main milk line pipe, air line pipes associated with the respective milk line branch pipes, two fittings each accommodating a pair of air line connections, and means for removably connecting each of the fittings to the header block, substantially as described.

3. In a milking machine, the combination with a milk receptacle, a header block removably supported upon the receptacle, a milk line connection between the receptacle and the header block, the same being removably connected with the receptacle, branch milk line pipes connected with the header block and communicating therethrough with the main milk line pipe, a pair of air line fittings each removably supported upon the header block, a main air line pipe leading to each fitting, and a pair of branch air line pipes leading from each fitting, substantially as described.

4. In a milking machine, the combination with a milk receptacle, a header block removably supported upon the receptacle, a milk line connection between the receptacle and the header block, the same being removably connected with the receptacle, branch milk line pipes connected with the header block and communicating therethrough with the main milk line pipe, a pair of air line fittings each removably supported upon the header block, a main air line pipe leading to each fitting, and a pair of branch air line pipes leading from each fitting, each air line pipe being connected with the associated branch line milk pipes, substantially as described.

5. In a milking machine, the combination with a milk receptacle having thereon a removable cover, operating mechanism carried by the cover, a handle upstanding from the operating mechanism, a header block removably connected with the handle, a main milk line connection leading to the header block and removably entered into the cover, four branch milk line connections leading to the header block, and air line connections supported upon the header block, substantially as described.

6. In a milking machine, the combination with a milk receptacle having thereon a removable cover, operating mechanism carried by the cover, a handle upstanding from the operating mechanism, a header block removably connected with the handle, a main milk line connection leading to the header block and removably entered into the cover, four branch milk line connections leading to the header block, a pair of oppositely disposed studs outstanding from the header block, a milk line fitting mounted upon each of the studs, the connection between each stud and its associated fitting being such that the latter may be removed from the stud when turned to a given position and retained thereon in other positions, a main air line pipe leading to each of the fittings, and a pair of branch air pipes leading from each of the fittings, substantially as described.

7. In a milking machine, the combination with a milk receptacle having thereon a removable cover, operating mechanism carried by the cover, a handle upstanding from the operating mechanism, a header block removably connected with the handle, a main milk line connection leading to the header block and removably entered into the cover, four branch milk line connections leading to the header block, a pair of oppositely disposed studs outstanding from the header block, a milk line fitting mounted upon each of the studs, the connection between each stud and its associated fitting being such that the latter may be removed from the stud when turned to a given position and retained thereon in other positions, a main air line pipe leading to each of the fittings, and a pair of branch air pipes leading from each of the fittings, the associated branch air line pipes and branch milk line pipes being connected together, substantially as described.

FREDERICK A. GESSLER.